United States Patent [19]

Young

[11] Patent Number: 4,682,665
[45] Date of Patent: Jul. 28, 1987

[54] PORTABLE LOW PROFILE MECHANICAL SCALES

[76] Inventor: Brad J. Young, 48 Fort Clark Estates, Benwood, W. Va. 26031

[21] Appl. No.: 898,329

[22] Filed: Aug. 20, 1986

[51] Int. Cl.$^4$ .................... G01G 19/08; G01G 21/08
[52] U.S. Cl. .................................. 177/139; 177/140; 177/257
[58] Field of Search ................ 177/139, 140, 256–259

[56] References Cited

U.S. PATENT DOCUMENTS

| | | | |
|---|---|---|---|
| 656,717 | 8/1900 | Emery, Jr. ........................... | 177/140 |
| 1,165,714 | 12/1915 | Ruckes . | |
| 2,358,770 | 9/1944 | Carliss ................................ | 177/139 |
| 3,065,808 | 11/1962 | Dodgen ......................... | 177/139 X |
| 3,358,785 | 12/1967 | Mayer et al. ......................... | 177/256 |
| 3,431,992 | 3/1969 | Whitecar ............................. | 177/140 |
| 4,533,009 | 8/1985 | Evans .................................. | 177/139 |

*Primary Examiner*—George H. Miller, Jr.
*Attorney, Agent, or Firm*—Eugene F. Buell

[57] ABSTRACT

A portable low profile mechanical scale is provided having a carriage with spaced side frames each with wheel means at one end and ground support means at the other end, spacers between the side frames holding them in fixed parallel relation, removable wheeled lift means engaging the side frames adjacent the ground support means for moving the side frames, a pair of torsion bars above said side members at two different parallel levels, one adjacent each side frame and supported thereon by triangular links fixed to the torsion bars at one end and supported on the side members at the other, a weigh bed movable vertically between the side frames and pivoted to the triangular links between the torsion bar and support on the side frames, a lever on each torsion bar adjacent said wheel lift means extending transversely toward each other, one above the other, a link connecting said levers midway between the side frames and a connector on the uppermost lever for connecting to a weight indicating mechanism.

6 Claims, 9 Drawing Figures

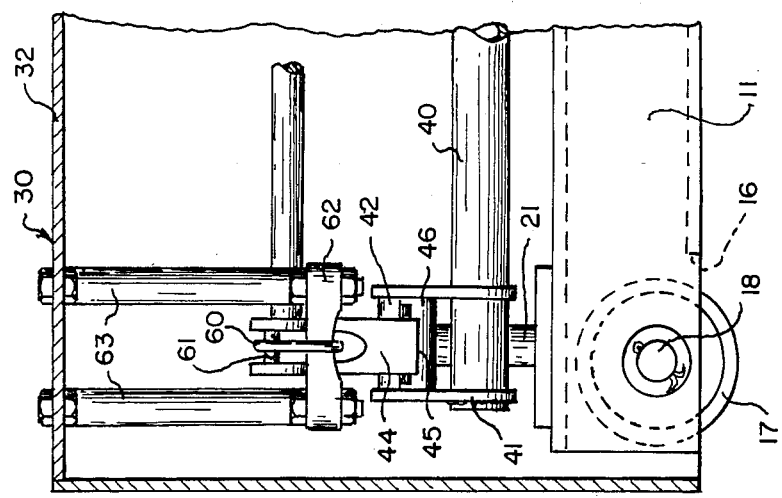
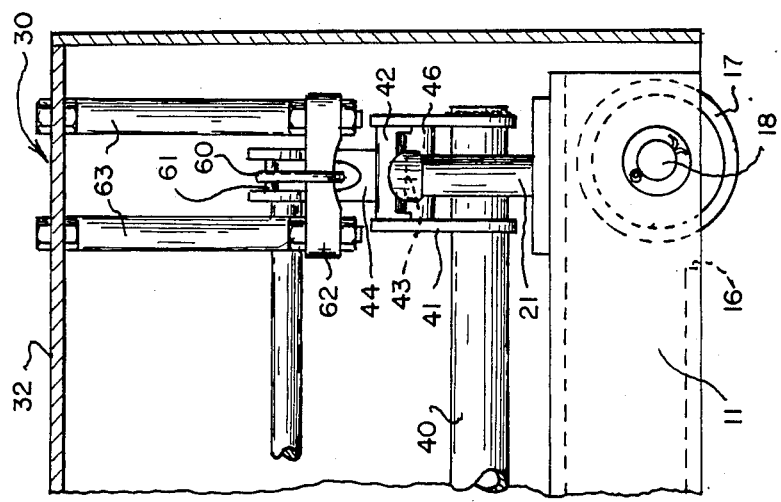
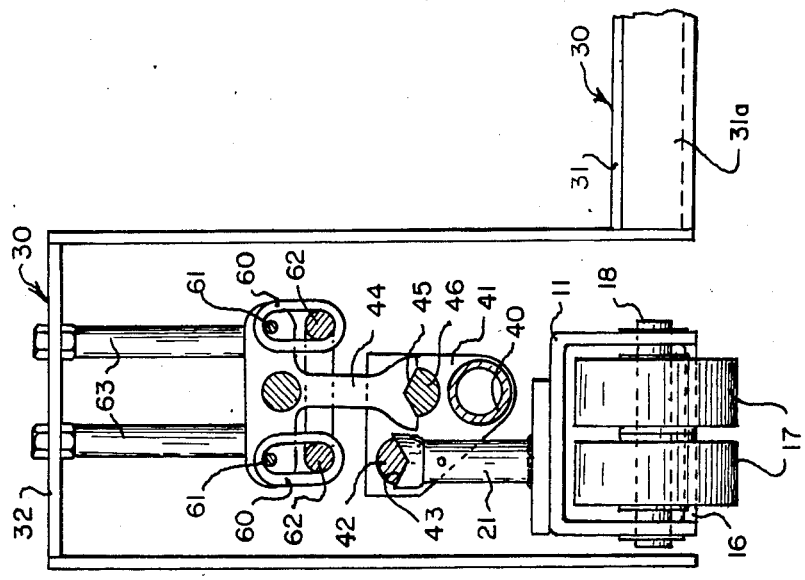

PORTABLE LOW PROFILE MECHANICAL SCALES

This invention relates to low profile scales and particularly to a load platform of low profile mounted on a chassis by a system of weight levers which places the load platform at substantially the level of the chassis axle.

It has long been known to build into lift trucks, a weight system in which a weighing platform was suspended on levers on the truck chassis. Generally these systems have been of higher profile than desirable, particularly for heavy and unwilling objects such as drums. In addition, it has generally been necessary to sacrifice some stability and strength in order to achieve the weighing function. Typical of such prior systems are those disclosed in Evans U.S. Pat. Nos. 4,533,009; Whitecar 3,431,992; Carliss 2,358,770; Ruckes 1,165,714 and Emery 656,717. All of these patents disclose a structure for lifting and weighing a drum or similar object. In all cases they are relatively complex and of relatively high profile. None of them teach or suggest a low profile scale as here disclosed.

I have invented a novel portable low profile mechanical scale in which the weighing assembly is effectively an outrigger from the weighing deck permitting the deck to be located at substantially floor level and still be manually portable on wheels. No portable scale structure has, so far as I am aware, ever been heretofore proposed.

I provide a low profile scale comprising a carriage having a pair of spaced apart side frame members, each having wheel means at one end and ground support means adjacent the other end, spacer means extending between said side frame members substantially at ground level holding said side frames in fixed spaced apart parallel relation, wheeled lift means at said other ends for lifting the said other ends to raise the ground engaging means and permit movement of said side frame member, a pair of torsion bars above said side frame members one adjacent each side frame member and each fixed to one end of spaced link means, said link means being pivoted at the other end on said side frame members, said torsion bars being generally parallel to each other and at two different levels above said side frame members, platform or deck means movable vertically between said frame members and pivoted to said link members adjacent the torsion bars, lever means on each said torsion bar adjacent said wheeled lift means extending transversely toward each other one above the other, link means connecting the end of the lowermost lever to the other lever spaced from its end, and connection means on the end of said other lever for connection to a weight indicating mechanisim. Preferably the deck means is a generally U-shaped platform adapted to fit between said side members. The link fixed to the torsion bar is preferably generally right triangular shape with the torsion bar fixed adjacent one of the non-right angle apices and the deck means pivotally connected adjacent the right angle. The wheeled lift means is generally a tow bar member pivotally connected to the other end of the side frame members.

In the foregoing general description, I have set on certain objects, purposes and advantages of this invention. Other objects, purposes and advantages of this invention will be apparent from a consideration of the following description and the accompanying drawings in which.

Figure 1:
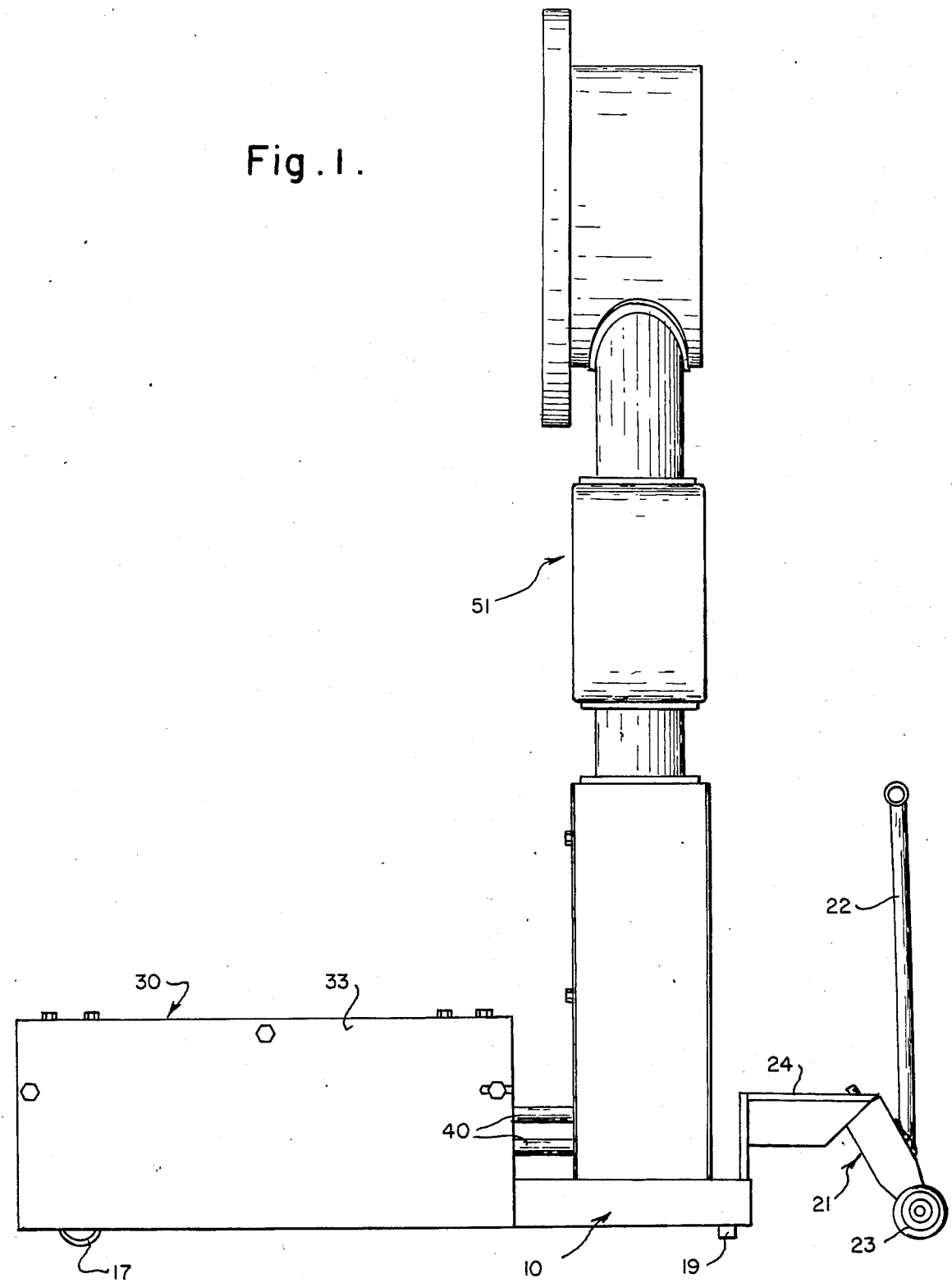
FIG. 1 is a side elevational view of a portable low profile scale according to this invention.
Figure 2:
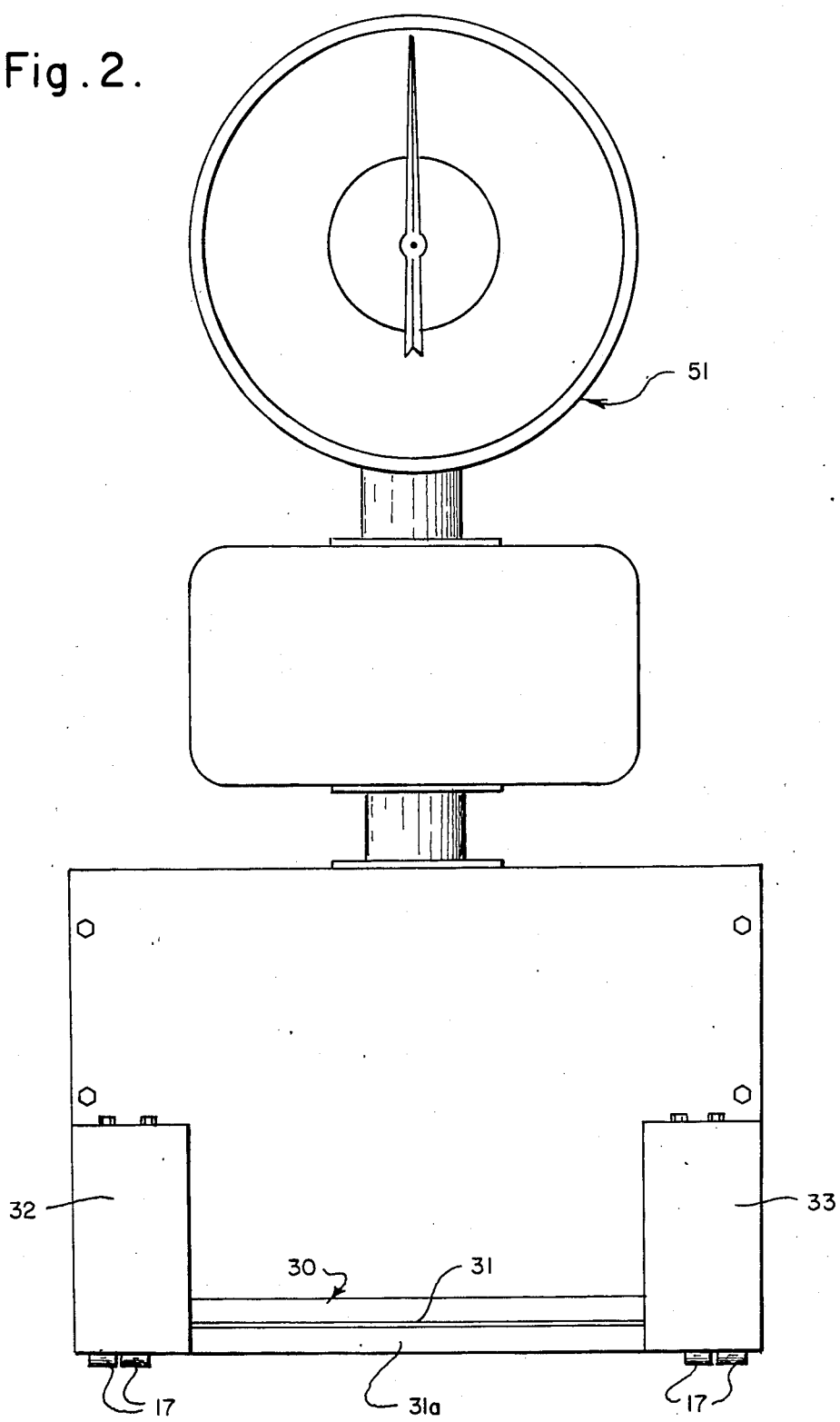
FIG. 2 is a front elevational view of the scale of FIG. 1.
Figure 3:
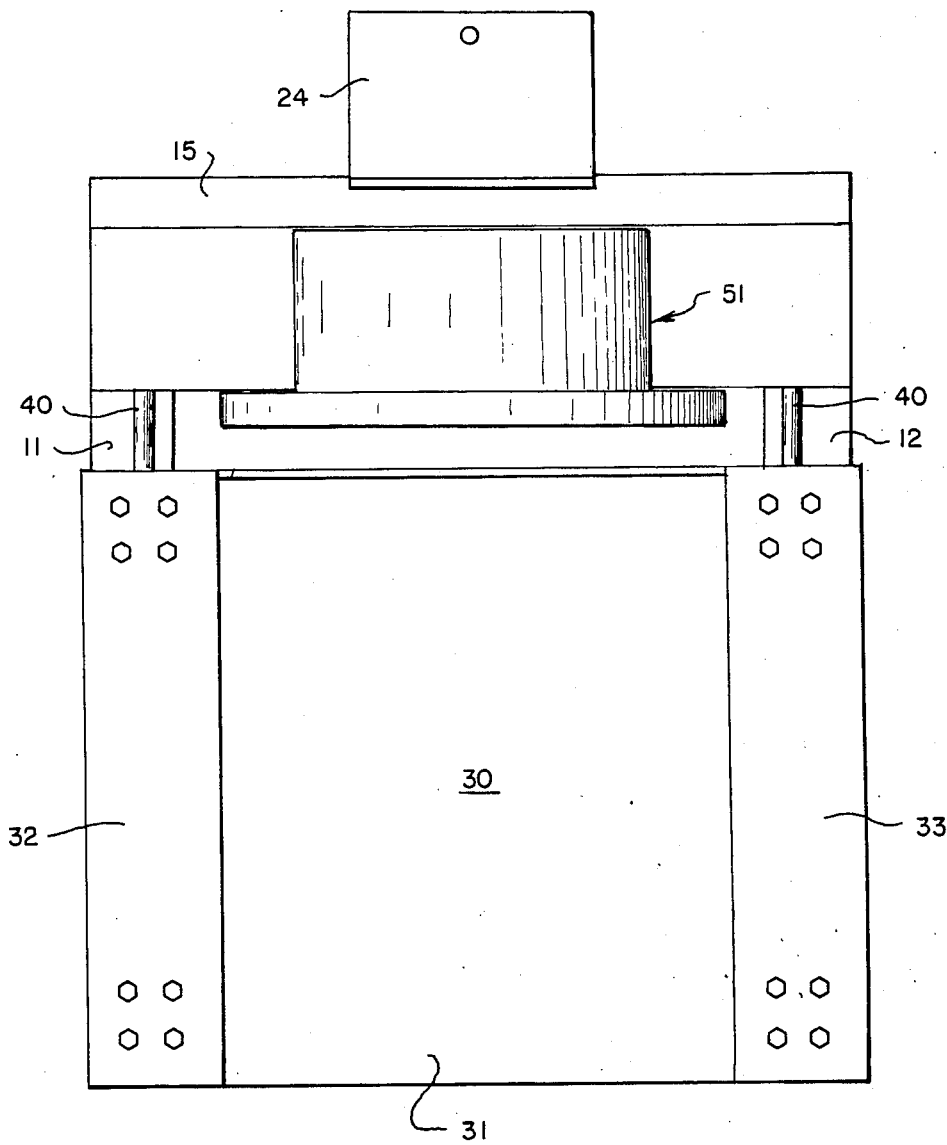
FIG. 3 is a top plan view of the scale of FIG. 1.
Figure 4:
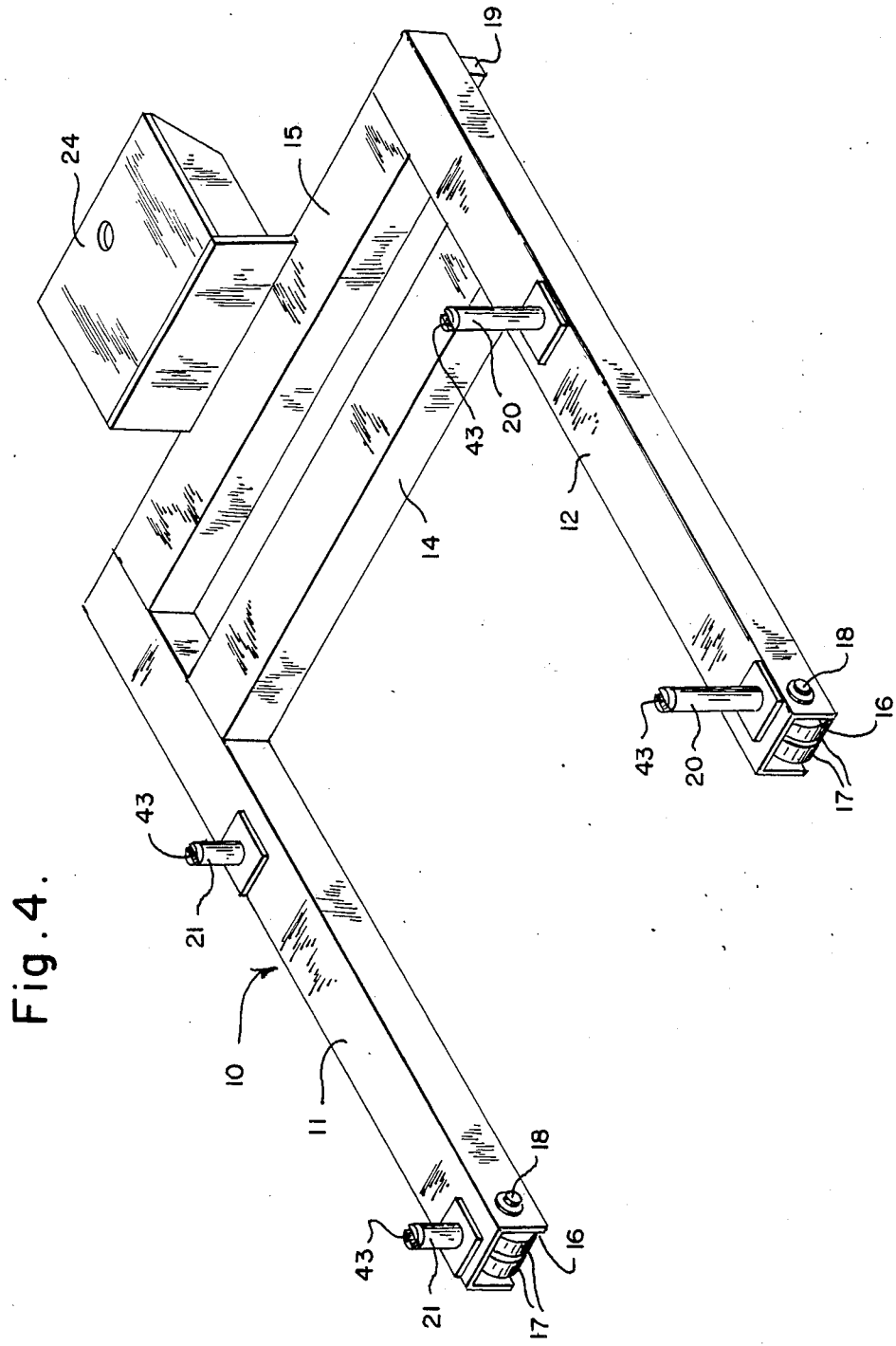
FIG. 4 is an isometric view of the carriage assembly.
Figure 5:
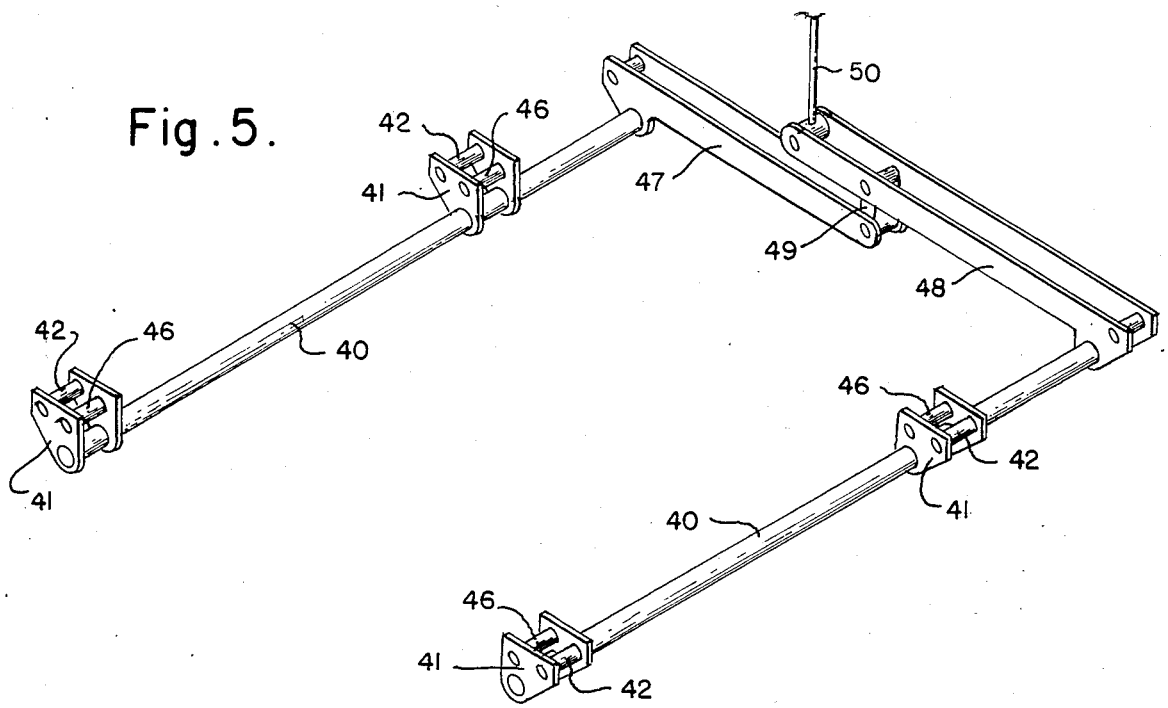
FIG. 5 is an isometric view of the lever assembly.
Figure 6:
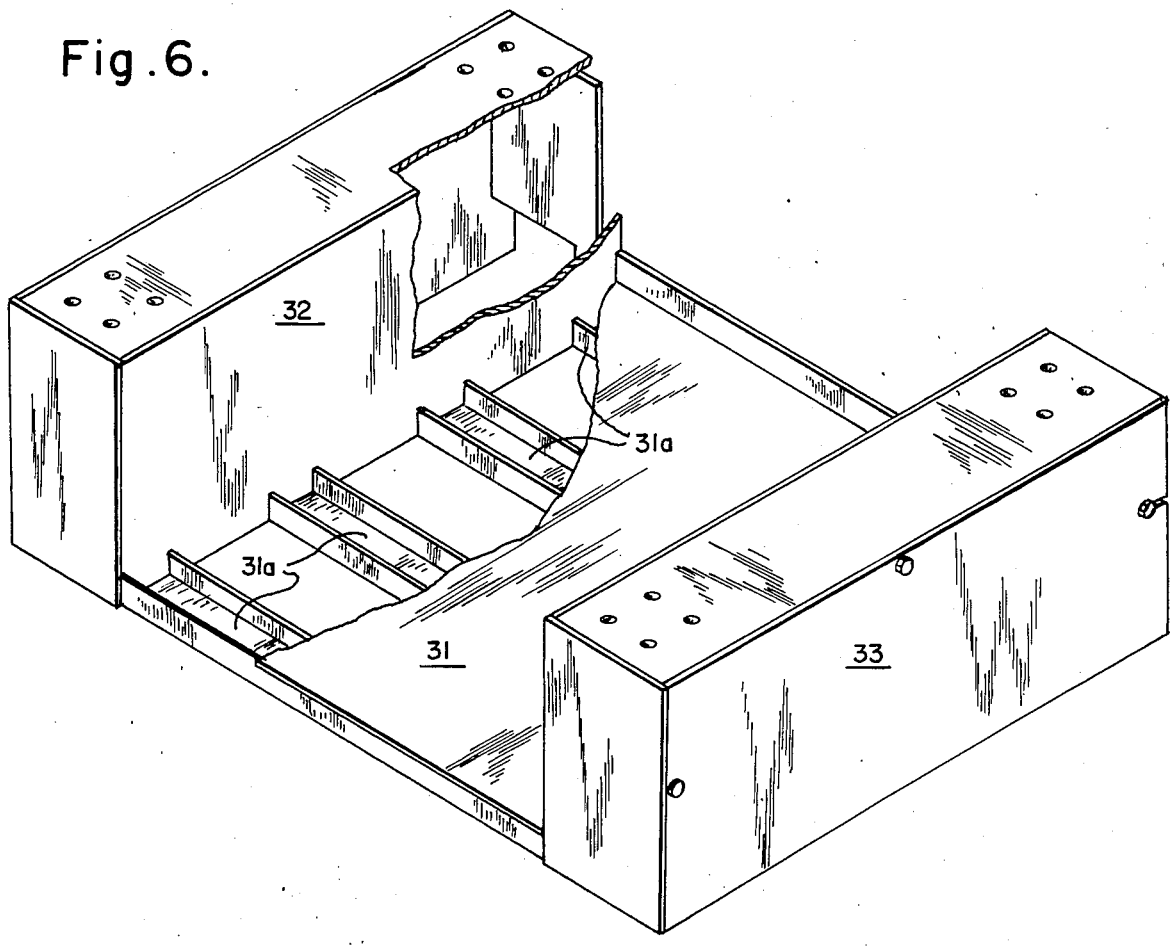
FIG. 6 is an isometric view of the weigh bed with portions broken away.

FIG. 7 an enlarged detailed view partly in section of one support means of the torsion bar, lever assembly relative to the weigh bed and carriage;

FIG. 8 is a view of assembly shown in FIG. 7 as viewed from the left thereof; and FIG. 9 is a view of assembly shown in FIG. 7 as viewed from the right thereof.

Referring to the drawings I have illustrated, a portable low profile scale having a carriage 10 made up of two spaced side frames 11 and 12 of rectangular tubing, spaced apart by a pair of rectangular tubing spacers 14 and 15 spaced apart and parallel to each other adjacent the rear ends of the side frames. Each side frame 11 and 12 is cut out at the bottom to provide an opening 16 for support wheels 17 on shaft 18 fixed in the side frames. Each side frame is also provided with a ground engaging support 19 adjacent the end of the side frames remote from wheels 17, to support the carriage in a level fixed position while loading and weighing. Each side frame is also provided with a pair of pillars or pedestals 20 and 21 of different heights one adjacent the front and the other intermediate the ends of the side frames. The pedestals 20 on one side frame being higher than pedestals 21 on the other. The purpose of these pedestals will be discussed later. A tow bar 21 comprising a handle 22 and wheels 23 is pivotally engaged to a carriage extension 24 and is used to raise the carriage 10 so that the ground engaging supports 19 are free, allowing the entire scale and contents to be moved on wheels 17 and 23.

A weigh bed 30 is of generally U-shape having a deck 31 supported by channels 31a welded to upstanding sides 32 and 33 on opposite ends of the channels 31a. The sides 32 and 33 extend outwardly and downwardly above the side rails 11 and 12 respectively of the carriage 10 to enclose the lever assembly to be discussed.

A pair of torsion bars or rods 40 are fixed at one end and at a point intermediate their ends to one end of triangular links 41 as by welding. Each link 41 is made up of two spaced triangular pieces having a shaft 42 fixed at the other end of triangular links 41 and adapted to rest on saddle grooves 43 on the top of each pillar 20 and 21. The weigh bed 30 of the scale is provided at the front end and adjacent its rear end with T-shaped support member 44 having a saddle member 45 at the bottom of the leg of the T adapted to rest on a shaft 46 fixed at the right angle apex of the triangular links 41. The rear end of each torsion bar or rod 40 is provided with a lever arm, one 47 of which is shorter than the other 48. Both extend transversely of the carriage, the longer above the shorter. They are connected together by a vertical connector link 49 intermediate the width of the carriage. The longer link 48 extends beyond the connecting link 49 and is provided at its free end with a rod 50 for connection to a weighing mechanism 51, such as, for example Detecto Model 3050 dial attachment.

The weigh bed 30 is suspended on the lever assembly by links 60 which depend from pins 61 on each end of the cross portion of the T member 44. The lower end of the link 60 engages a cross bar 62 suspended from the upstanding sides 32 and 33 by spacers 63.

The operation of the scale is believed to be clear from the foregoing disclosure and no further explanation is deemed necessary.

In the foregoing specification I have set out certain preferred practices and embodiments of this invention. However, it will be understood that this invention may be otherwise embodied within the scope of the following claims.

I claim:

1. A portable low profile mechanical scale comprising a carriage having a pair of spaced apart side frame members, each having wheel means at one end and ground support means adjacent the other end, spacer means extending between said side frame members substantially at ground level holding said side frame members in spaced apart parallel relation, wheeled lift means at said other ends of the side frame member for lifting said other ends to raise the ground support means, a pair of torsion bars above said side members at two different parallel levels, one adjacent each side frame and supported theron by triangular link means fixed to the torsion bars at one end and supported on the side members at the other, weigh bed means movable vertically between said side frame members and pivoted to said link members between the torsion bar and support on the side frame members, lever means on each torsion bar adjacent said wheel lift means extending transversely toward each other, one above the other, link means connecting said lever means midway between said side frame members and connector means on the end of the lever above the other for connection to a weight indicating mechanism.

2. A portable low profile mechanical scale as claimed in claim 1 wherein the side frame members are rectangular tubing, having at cut out portion at the bottom adjacent one end carrying wheels supporting the said one end of the side frame members.

3. A portable low profile mechanical scale as claimed in claim 1 wherein the wheeled lift means is a tow bar member having wheels pivoted to the carriage and a vertical long arm for a handle.

4. A portable low profile mechanical scale as claimed in claim 1 wherein the weigh bed is of generally U-shape having outwardly extending skirting over the side frame member.

5. A portable low profile mechanical scale as claimed in claim 1 or 2 or 3 or 4 wherein the torsion bars are suspended on the side frame members on pedestals fixed to the side frames, the pedestals on one side frame being higher than the pedestals on the other side frame whereby the torsion bars are suspended in two parallel planes one above the other.

6. A portable low profile mechanical scale as claimed in claim 5 wherein the triangular link means is a pair of spaced apart right triangular members connected together by shafts at substantially the right angle apex and one end apex and by the torsion bar at the other end apex.

* * * * *